Oct. 26, 1965   A. SCHEPPERS   3,213,917
FURNACE COMBUSTION CHAMBERS
Filed July 10, 1963
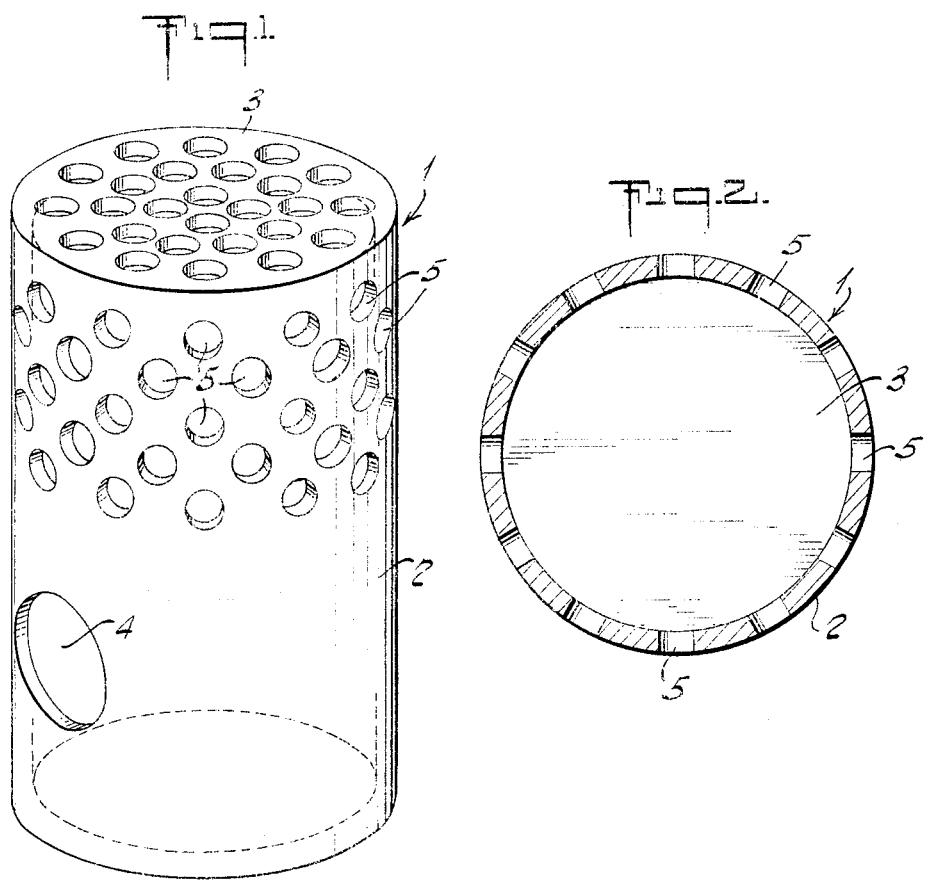
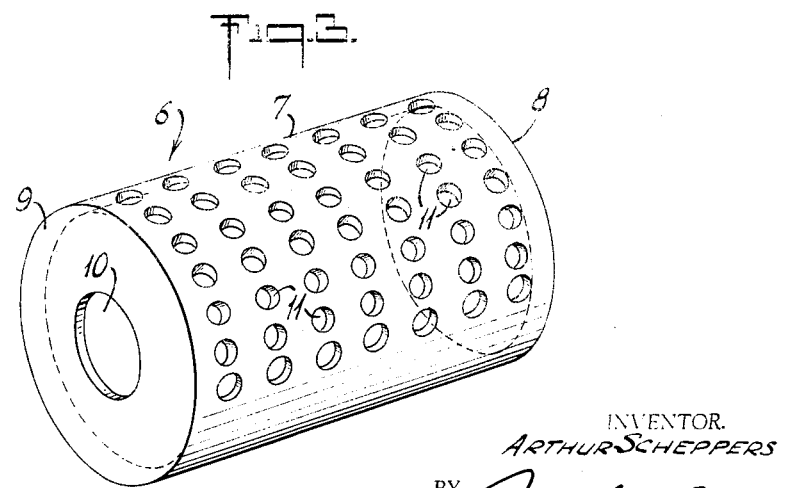
INVENTOR.
ARTHUR SCHEPPERS
BY John A. McKinney
ATTORNEY

3,213,917
FURNACE COMBUSTION CHAMBERS
Arthur Scheppers, Martinsville, N.J., assignor to Johns-Manville Corporation, New York, N.Y., a corporation of New York
Filed July 10, 1963, Ser. No. 293,975
6 Claims. (Cl. 158—1)

This invention relates to improved combustion chambers or liners therefor for furnaces and boilers, and more particularly to low density, insulating refractory combustion chambers or liners providing uniform and high heat transmission.

Recent innovations in the furnace and boiler industry comprise the construction or manufacture of combustion chambers or liner units of low density refractory materials which by virtue of their low densities and porous physical properties comprise inherently good and efficient thermal insulators. Exemplary of such combustion chambers are those fabricated from low density refractory fiber felts, mats, etc. such as the construction illustrated in Canadian Letters Patent No. 610,978, or molded from dispersions of refractory fiber and inorganic binder, etc. Furnace chambers or liners composed of low density refractory fibrous bodies and appropriate binders are relatively strong and resistant to very high temperature conditions providing durable and enduring low cost units which effectively prolong the life of adjacent furnace walls or components due to their high efficiency in thermal insulating properties. Their high insulating characteristics, however, have been found to comprise a decided disadvantage in markedly reducing the efficiency of the furnace operation in some types of furnaces and/or constructions wherein the insulating combustion chamber or liner effectively insulates the source of heat located within the chamber from the externally located heat exchanger or boiler tubes, etc., or the area containing the same, impeding or blocking the flow or transfer of heat. Moreover, with open end or side refractory insulating combustion chambers or liners, the heat from the burner or source within the chamber or liner is concentrated by the insulating chamber walls and directed or channeled to that portion of the furnace, heat exchanger, boiler tubes, etc. located adjacent or opposite such open end or side of the chamber or liner, reducing efficiency due to uneven heat distribution and accelerating the rate of deterioration of the over-heated furnace area or components.

It is a primary object of this invention to provide a low cost and durable, low density and in turn efficient thermal insulating combustion chamber or liner which enables and facilitates the efficient transmission and uniform conveyance of heat from the source or area thereof within the insulated chamber or liner to the over-all surface of the heat exchanger, boiler, etc.

It is also an object of this invention to provide a low cost and durable combustion chamber or liner which effectively and uniformly conducts and distributes heat from the burner or heat source in an equalized or controlled pattern over the body of the heat exchanger, etc., effecting a more efficient operation and prolonging the over-all life of the unit.

These and other objects and advantages of this invention will become apparent and will be more fully understood from the following description and accompanying drawings wherein:

FIG. 1 is a pictorial view illustrating one exemplary type or construction of combustion chamber or liner of this invention;

FIG. 2 is a cross-sectional plan view of the upper portion of the combustion chamber of FIG. 1 illustrating the orifices extending through the chamber wall; and FIG. 3 is also a pictorial view of another exemplary type of combustion chamber of this invention.

This invention comprises the construction of low density and in turn effective thermal insulating furnace combustion chambers or chamber liners having a plurality of heat transmitting and directing orifices or apertures distributed at spaced intervals over the wall member forming and defining the said chamber.

Referring to the drawing, FIG. 1 illustrates a typical cylindrical combustion chamber 1 designed for installation in a vertical position comprising a cylindrical member 2 closed at each end, the uppermost closing being shown at 3. Combustion chamber 1 is provided with an appropriate opening 4 to accommodate the means providing the heat source such as the nozzle of an oil burner or gas jet. Distributed over an area of the surface of chamber 1 located in proximity to the heat exchanging means, etc., are a plurality of heat transmitting orifices or openings 5 extending through the chamber wall and spaced at appropriate intervals to provide maximum and/or uniformly controlled heat transmission while maintaining good and ample strength and rigidity in the chamber or liner structure.

FIG. 3 illustrates another embodiment of this invention comprising a horizontally positioned combustion chamber 6 similarly constructed of a cylindrical wall member 7 having closed ends 8 and 9 with an opening 10 provided in end 9 to accommodate a typical burner means or heat source. Heat transmitting and distributing orifices 11 are provided at spaced intervals providing openings over the entire upper area of the cylindrical section of the wall member 7.

To provide effective and optimum heat transmission commensurate with strength requirements in a light weight fibrous combustion chamber of high insulating efficiency, the heat transmitting orifices should provide a total open area in the chamber wall within the range of approximately 5 to 50% and typically approximately 10 to 35% of the over-all surface of the wall(s) forming and defining the combustion chamber, exclusive of the opening(s) provided for the heat source, and at least about as large an area as the opening accommodating the heat source or blast tube and preferably from about 4 to 10 times the area of the said opening provided for and accommodating the said heat source or means. The heat transmitting orifices range in size from about 0.1 square inch to about 3 square inches in diameter, and preferably comprise approximately 0.5 to 2 square inches. These orifices can be located over the entire surface of the chamber wall including one or both end portions, but more aptly are positioned or constructed in the chamber wall at a location(s) or area(s) substantially adjacent or in close proximity and conterminous to that portion(s) of the furnace comprising or embodying the heat exchanging or transmitting means whereby maximum efficiency is achieved. Moreover, the orifices can be relatively uniformly spaced over said adjacent or proximate location or area to achieve substantially equalized heat distribution, or their pattern can be arranged or designed to concentrate or regulate and direct the heat flow to localized areas.

It should be understood, however, that details such as the location and/or arrangement of the heat transmitting and directing orifices as well as the size and number of orifices or total open heat conveying area are factors which for optimum effectiveness must be designed or determined to comply or meet with the conditions prevailing in the particular furnace of incorporation.

The light weight and in turn thermal insulating chambers or chamber liners to which this invention is directed typically comprise those constructed from combinations of refractory fibers and inorganic binders, and possibly refractory filler materials. Suitable refractory fiber comprises those formed of alumina-silica materials alone or in combination with zirconia and/or titania, silica fibers such as quartz or leached glass, magnesia, and the like highly refractory fibrous materials employed in the art. Suitable inorganic binders comprise borax, colloidal silica, colloidal alumina, phosphates, clays such as bentonite and hectorite, alkali metal silicates, etc. Frequently, fillers of light weight aggregates are included and non-refractory fiber such as asbestos or kraft pulp and fugitive binders of combustible composition are employed to facilitate formation, impart "green" or unfired strength, eac. Effective combustion chambers, or linings comprising chambers for furnace installations can be formed from such materials as by felting fibrous and binder components and fabricating the resulting refractory felt into approximate configurations designed to meet the dimensions of a particular furnace, by filter molding chambers of apt dimensions and configurations from a dilute aqueous slurry of the components, or simply shaping and consolidating a wet admixture of appropriate components. In most instances it is not practical or possible to mold the chamber in its entirety because of its closed configuration. Thus the chambers or liners are molded in two or more sections of components and cemented together, either before or after prefiring, with a suitable refractory cement. Typical light weight refractory fiber combustion chambers of the type to which this invention relates have composition densities in the range of approximately 6 to 35 p.c.f. and commonly of about 10 to 12 p.c.f., hence their very effective insulating properties.

The heat transmitting orifices or apertures extending through the chamber wall and the opening therein adapted to accommodate the burner means can be conveniently formed in compositions of this nature simply by cutting or drilling or the like conventional suitable means, and in cast or molded chambers the orifices may be formed therein during the casting or molding process by means of aptly conformed molds or dies or subsequently cut therein. A further method of producing the perforated chambers of this invention is to form the chamber or liner with the wall(s) or apt portions thereof of such a high and substantially uniform porosity as to enable ample heat transmission directly through the internal interstitial pores of the fibrous body. Heat transmitting interstitial pores within such structures or walls can be obtained by incorporating into the mix of refractory fiber and binder, etc., an organic or combustible material such as wood chips, chopped kraft board, or the like combustible particles. These heat consumable particles preferably should be of the order of about ¼ to ⅝ inch long with an average cross section area of approximately 0.003 inch square and may vary up to 0.1 inch square. The proportion of such particles included in the mix may range between about 10 to 60% (dry basis) by weight depending upon the extent of porosity and in turn degree of heat transmission desired or required but normally in the order of about 30% of the fugitive particles will suffice in most installations.

It is to be understood that the foregoing details are given for the purpose of illustration and not restriction and that variations within the spirit of the invention are to be included within the scope of the appended claims.

I claim:

1. A furnace combustion chamber constructed of a low density insulating refractory wall of bonded fibrous felt of approximately 6 to 35 p.c.f. consisting essentially of refractory fiber and inorganic binder having distributed in spaced intervals over its surface a plurality of heat transmitting orifices, the total open area in said wall resulting from the orifices therein comprising from approximately 5 to 50% of the over-all surface of the wall forming the combustion chamber.

2. A furnace combustion chamber constructed of a low density insulating refractory wall of bonded fibrous felt of approximately 6 to 35 p.c.f. consisting essentially of refractory fiber and inorganic binder having distributed in spaced intervals over its surface a plurality of heat transmitting orifices, the total open area in said wall resulting from the orifices therein comprising from approximately 10 to 35% of the over-all surface of the wall forming the combustion chamber.

3. The furnace combustion chamber of claim 2, wherein the plurality of heat transmitting orifices distributed in spaced intervals over an area of the surface of the chamber wall are sized from approximately 0.1 square inch to approximately 3 square inches.

4. A furnace combustion chamber constructed of a low density insulating refractory wall of bonded fibrous felt of approximately 6 to 35 p.c.f. consisting essentially of refractory fiber and inorganic binder provided with a relatively large opening adapted to accommodate the terminal portion of a furnace burner and having distributed in spaced intervals over its surface a plurality of heat transmitting orifices, the total open area in said wall resulting from the heat transmitting orifices comprising from approximately 5 to 50% of the over-all surface of the wall forming the combustion chamber.

5. A furnace combustion chamber constructed of a low density insulating refractory wall of bonded fibrous felt of approximately 6 to 35 p.c.f. consisting essentially of refractory fiber and inorganic binder provided with a relatively large opening adapted to accommodate the terminal portion of a furnace burner and having distributed in spaced intervals over its surface a plurality of heat transmitting orifices, the total open area in said wall resulting from the heat transmitting orifices comprising from approximately 10 to 35% of the over-all surface of the wall forming the combustion chamber.

6. The furnace combustion chamber of claim 5, wherein the plurality of heat transmitting orifices distributed in spaced intervals over an area of the surface of the chamber wall are sized from approximately 0.1 square inch to approximately 3 square inches.

References Cited by the Examiner

UNITED STATES PATENTS

| 781,922 | 2/05 | Thomson | 158—1 |
| 1,574,839 | 3/26 | Morse | 158—1 |
| 2,669,297 | 2/54 | Sherman | 158—4 |

FOREIGN PATENTS

| 610,978 | 12/60 | Canada. |
| 1,228,433 | 3/60 | France. |
| 727,174 | 3/55 | Great Britain. |

OTHER REFERENCES

German printed application 1,118,950, Nugel, printed Dec. 7, 1961.

JAMES W. WESTHAVER, *Primary Examiner.*

MEYER PERLIN, *Examiner.*